Patented Nov. 30, 1926.

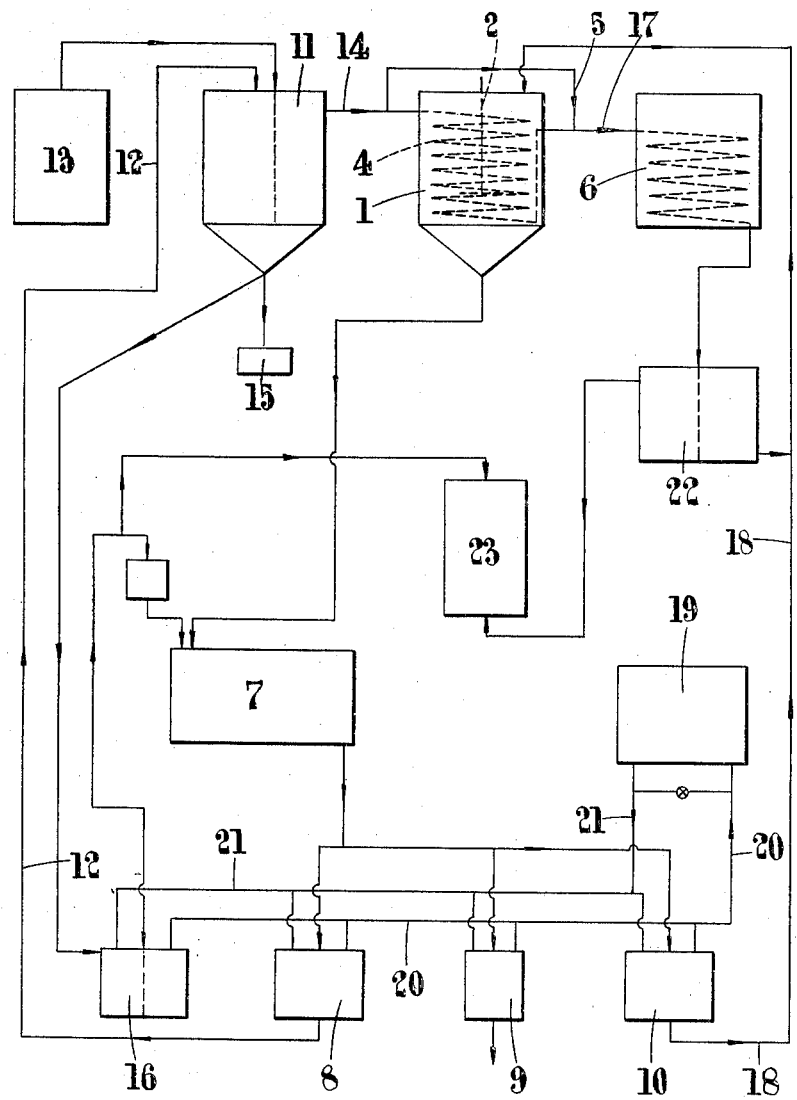

1,608,844

UNITED STATES PATENT OFFICE.

GEORGE WALDRON EDWARDS AND HENRY THOMAS DURANT, OF LONDON, ENGLAND.

TREAMENT OF OXIDIZED ORES OR OTHER OXIDIZED COMPOUNDS OF COPPER AND ZINC.

Application filed November 10, 1923, Serial No. 673,867, and in Great Britain November 20, 1922.

This invention relates to the treatment of ores or other materials, containing one or both of the metals copper and zinc, in the oxidized condition, and it relates more particularly to the treatment of materials of the kind stated by leaching them with an aqueous solution of ammonia and an ammonium salt, for the purpose of separating the metal or metals referred to from the gangue and other waste material.

The oxides and hydroxides of the above metals are readily soluble in such a solution, but the term "oxidized condition", as used herein, is not limited to these compounds, but is rather used in the wider sense, common to metallurgy, as including other compounds, such as for example, silicates and carbonates, the naturally occurring forms of which are generally termed oxidized minerals. It should however be understood that where the desired metal or metals contained in such an oxidized mineral are present therein in a form which is insoluble in a solvent of the kind referred to, the material must be submitted to some preliminary treatment to render the metal or metals soluble, and such preliminary treatment, which per se forms no part of the present invention, may consist of any known and/or suitable method which will cause the copper and/or zinc values to be present in a soluble form: It will therefore be apparent that the present process is applicable both to naturally occurring minerals and the like, or to artificially prepared compounds, in which the metals are present in an oxidized condition, and soluble in a solvent of the kind referred to, such as for example a roasted sulphide ore.

In the extraction of copper from certain of its oxidized ores, the method of treating the ores by a static leaching with a cold solution of ammonium carbonate and ammonia has been employed, and this method has usually occupied several days, and probably due to the shrinkage and fissuring of the mass, which of course becomes more marked as the copper contents increase, repeated leaching and washing operations were necessary, in order to secure a good extraction of the copper contained in the mass.

Now the object of the present invention is to provide a greatly improved method of treating ores or compounds of the kind referred to by an ammoniacal leaching operation, these improvements being directed principally to effecting a considerable reduction in the time necessary for carrying out the process and considerable economies in the cost thereof.

We have found that if oxidized ores or other compounds containing one or both of the metals copper and zinc, in the oxidized condition, are treated for the purpose of extracting the metal or metals by a leaching operation, using a hot aqueous solution of an ammonium salt and free ammonia, a practically complete extraction of the metal can be effected in a much reduced time. The temperature is maintained slightly below that at which dissociation of the ammonium salt or precipitation of the metal would commence. We have also found that if during leaching of a charge, the latter is kept mechanically stirred or agitated, a considerable saving of time is effected, not only in the actual solution, but also in the subsequent washing, which can then be done in a filter press or the like. It has been found that by proceeding in this manner, a practically complete extraction of the metals can be effected in about one hour, and on completion of the extraction, the solution is separated from the gangue, preferably by means of a filter press, or other suitable filtering means. The metal containing solution is then transferred to another vessel, in which its temperature is raised further so as to dissociate some or all of the ammonium salt, and drive off some or all of the ammonia, thereby precipitating a compound of the metal or metals in a form in which it can be smelted. The vapours given off from the dissociation referred to, and the free ammonia driven off, are re-condensed and used again, but as these vapours are hot, their heat contents may before condensation, be utilized for heating another charge of material being leached, or for any other useful purpose.

The invention also comprises the provision of a plant specially adapted and arranged to carry out the process in question, with great economy, convenience and speed, and it further comprises various details of operation and arrangement incidental to carrying out the process.

The invention is carried out as follows, and one form of a plant suitable for the purpose, is diagrammatically illustrated by way of example in the accompanying drawing:—

The leaching solution may consist of an aqueous solution of any suitable ammonium salt and free ammonia, but it will generally be preferred to use an ammoniacal solution of ammonium carbonate. A convenient leaching solution for use with oxidized copper ores, has been found to be an aqueous solution containing about 6 per cent by weight of ammonia and 5 per cent of carbonic acid gas ($CO_2$), in which case of course, the ammonium salt is ammonium carbonate. The temperature of dissociation of such a solution when used in excess with oxidized copper ores, has been found to be in the neighbourhood of 58° C.; below this temperature an increasing amount of copper was found to pass into solution as the temperature was raised from the normal, but once this temperature was passed, not only did no further solution take place, but precipitation of the copper already in solution commenced.

Although it is not desired to limit the invention by any theoretical explanation, it is believed that this phenomenon is due to the fact that above the stated temperature, the ammonium carbonate dissociates and is no longer present in the solution as such. It will of course be apparent that the upper limit of temperature for leaching will depend on the temperature at which the particular leaching solution being used commences to dissociate, or the temperature at which the metal commences to precipitate, under the actual conditions of the particular operation, the preferred temperature being as near the limit as can conveniently be maintained, without precipitation or material evolution of $CO_2$ or ammonia actually taking place.

It should further be noted that the leaching operation although carried out with a hot solution, is carried out under normal or atmospheric pressure, the amount of free ammonia evolved during leaching as described herein being quite negligible, and means being provided for condensing and collecting even this small quantity.

The invention will now be described, by way of example only, as applied to the treatment of an oxidized copper ore, such as malachite, $CuCO_3Cu(OH)_2$, or azurite $2CuCO_3Cu(OH)_2$. The ore is first crushed, or otherwise reduced to a suitably fine state of division, and is then charged into a solution or leaching tank 1. This tank may be of any convenient shape, and it is fitted with a mechanically operated or like stirring or agitating means 2, for agitating the contents of the tank. This tank is fitted with a heating coil 4, or other convenient means for applying heat to the charge. The tank may be fitted with a cover or the like, provided with pipes 5, for conducting any ammonia vapours given off during the leaching operation, to a suitable condenser 6. The leaching solution consists of an aqueous solution of ammonium carbonate and ammonia, preferably of about the strength stated above.

The quantity of leaching solution used is such that there is an excess of ammonia and ammonium carbonate present and the leaching operation is carried out at a temperature slightly below the point at which dissociation, or precipitation, as above described, commences. A convenient temperature for an oxidized copper ore, and an ammoniacal solution of ammonium carbonate, has been found to be about 50° C., but the actual limit temperature at which the operation can safely and efficiently be carried out will depend on a variety of factors, such as the bulk of the liquid being heated, the nature of the ore, the excess of solvent, and the nature and efficiency of the heat regulating devices. As an excess of the solvent should always be present, precipitation will not commence immediately, even if the limit temperature be momentarily exceeded. The temperature is maintained at this level by heating means to be described, and a thermometer or any other suitable temperature indicating device may of course be employed. The charge is agitated during the operation, and when the process of solution is completed, which will generally be the case in about one hour, the charge is quickly run out through a suitable outlet to a filter press or other convenient filtering means 7, the strong metal-containing soltion is collected in a suitable vessel 8, and the gangue 9, is after being thoroughly washed, discharged. The wash waters are separately collected in a weak solution tank 10. The strong solution is next treated with as little delay as possible, in a precipitating vessel 11, to which it may be fed from the strong solution tank 8, by any convenient means, as for example, by means of the pipes 12. The precipitating vessel 11 is provided with heating means, preferably consisting of means for passing superheated steam from a boiler 13 through the solution.

The chagre in the vessel 11 is raised to a temperature above that at which the ammonium salt dissociates, and preferably to about the boiling point of the solution. At this temperature, some or all of the free ammonia in the solution will be given off, and the ammonium carbonate, or other ammonium salt, will be dissociated, thereby causing the copper to be precipitated in the form of oxide. The vessel 11 is so arranged that all the vapours given off during the heating operation, are conducted away by means of pipes 14. When the precipitation is completed, the vessel is discharged, and the oxide of copper, indicated diagrammatically at 15, is separated by means of a filter press settling tank, or in any other convenient manner, whilst the remaining boiled out solution may be separately collected in a vessel 16, and after cooling, may be utilized for washing a separate charge of gangue in the filter press 7, for which purpose, convenient pipe connections and storage vessels are of course provided. The hot vapours from the vessel 11 which are discharged into the pipe 14 are preferably utilized for heating a subsequent charge of leaching solution in the tank 1, and for this purpose the pipe 14 communicates with the heating coil 4, provided in that tank. This coil 4 discharges, as for example, by means of pipe 17, into the condenser 6, in which the vapours are recondensed, so as to be available for re-use in the preparation of further leaching solution. The pipe 5 provided on the leaching tank for collecting any small quantities of ammoniacal vapours given off during the leaching operation may conveniently communicate with the pipe 17, and also discharge into the condenser 6. Suitable connections may be provided for discharging the vapours from the pipe 14 direct to the condenser 6, instead of through the coil 4, if the temperature in leaching tank 1, should have reached the limit temperature previously refered to, or alternatively, for causing the said vapours to be utilized in any other leaching tank requiring heating at the particular time. With a view to heat economy, the various treatment and storage vessels, and liquid pipes, with the exception of the vessels 16, in which the boiled out solution is collected and cooled, are preferably lagged, or provided with a suitable heat insulating covering or the like.

On the other hand, if for any reason, the available hot vapours from the pipe 14 should be insufficient to raise the temperature in the leaching tank 1 to the desired amount, additional heat may be supplied from the boiler 13, or any other convenient source of heat.

Instead of heating the charge in the tank 1 by the vapours from the pipe 14, means may be provided for alternatively utilizing the hot cooling water from condenser 6 for this purpose, either by passing through the coil 4, or through a water jacket.

In the event of any of the pipes becoming choked with solid ammonium salt, the stoppage may be removed by means of steam in the ordinary way, and the salt collected through the condenser.

The ammonia distillate discharged from the condenser 6 may be separately collected in the vessel 22, from which it may be added to the weak solution contained in the vessel 10, and resulting from the washing of the charge in the filter press 7, and may in this manner be used again for the preparation of further leaching liquor, either with or without the addition of ammonia or ammonium salt, as may be found necessary from time to time. For this purpose, suitable pipe connections 18 are provided, for connecting the weak solution tank 10 to the leaching tank 1. A scrubber 23 may be provided to collect any vapours uncondensed in the condenser 6, and the cold boiled out solution from the vessel 16 may be utilized for absorbing such vapours. With a view to reducing the working losses of ammonia to a minimum, it is advisable to arrange the various vessels and their connections so that the whole cycle of operations is carried out, substantially in a closed circuit, and for this purpose, one or more air pumps 19 are provided, adapted to give both pressure and vacuum services, together with suction pipes 20 and pressure pipes 21, which pipes conveniently communicate with the various storage vessels and other parts of the plant so that the liquors may be moved from one level to another as may be required.

As will be seen from the drawing, the whole of the air in the plant is in a closed circuit, the only opportunity for escape of vapour being (1) when a fresh charge of ore is fed to the vessel 1: (2) when a filter press is opened, or (3) in the event of some unabsorbed $CO_2$ escaping through the scrubber where it is washed with boiled out, and consequently "ammonia free" solution.

It should further be noted that the various items of plant, indicated diagrammatically in the drawings, may of course be multiplied as desired, and suitable pipe and other connections between the several units of the plant will in such case be provided, so that for example, the liquor from any given leaching tank may be charged into any one of the various precipitation tanks whichever be vacant at the time, or so that the vapours given off from any of the precipitation tanks can be utilized for heating the solution in any of the leaching tanks which may require it at the particular time. Such extensions and variations of the plant, with a view to making all the various units of the plant, as far as possible, interchangeable, can of course be effected within the scope of the invention, and will be obvious to anyone skilled in the art.

The copper oxide obtained as a result of the process is ready for smelting to metal, by any known or convenient means, or may be utilized for the manufacture of copper sulphate, or any other desired purpose.

The invention has been described with reference to the treatment of certain copper ores with an ammoniacal solution of ammonium carbonate, but it is not limited either to the treatment of these particular ores, or to the use of this particular leaching solution, as it may, within the limits previously stated, be used for the treatment of other metallic ores, and with other leaching solutions, falling within the scope of the above description.

By means of the process herein described, the time of treatment for these ores is enormously reduced, and in many cases it is almost instantaneous, seldom exceeding one hour, as compared with several days, which was the normal time usually required for the cold static leaching operation as hitherto carried out.

The fact that the hot vapours given off when precipitating the dissolved metal are utilized for heating another charge of leaching solution, results in great economies of fuel, and consequently in working costs.

It will also be clear to those skilled in the art, that the present process may in many cases be advantageously applied for the separation of one or both of the stated metals from minerals or compounds containing them, together with other metallic compounds not soluble in the leaching solution, e. g. for the separation of zinc from an oxidized ore or material containing zinc and lead, in which case the lead will be left with the gangue in the filter 7, and can be extracted therefrom by any suitable means.

The plant described and illustrated diagrammatically, may of course be varied to suit varying conditions, and desired outputs, and this has only been illustrated with a view to showing one method by which the desired results, and the heat, fuel and other economies which are aimed at may be obtained.

We claim:—

1. The method of treating ores and the like containing metal in the oxidized condition, which consists in leaching the ore with an excess of an aqueous solution of an ammonium salt containing an excess of free ammonia, stirring the charge and maintaining the temperature of the mass throughout the operation as near as possible to but slightly below the temperature at which the ammonium salt commences to dissociate, and the dissolved metal commences to be precipitated.

2. A method of treating ores and the like, as claimed in claim 1, in which on completion of the leaching operation, the solution is rapidly and while still hot filtered from the gangue, and then further heating the solution so as to dissociate the ammonium salt to drive off the ammonia, thereby precipitating a compound of the metal and condensing the gases and vapors given off.

3. A method of treating ores and the like, as claimed in claim 1, in which on completion of the leaching operation, the solution is rapidly and while still hot filtered from the gangue, and then further heating the solution so as to dissociate the ammonium salt to drive off the ammonia, thereby precipitating a compound of the metal, heating another charge with the heated gases and vapors and condensing the gases and vapors.

In witness whereof we have hereunto set our hands.

GEORGE WALDRON EDWARDS.
HENRY THOMAS DURANT.